No. 648,157. Patented Apr. 24, 1900.
C. TOLLE.
CORN HARVESTER.
(Application filed Jan. 20, 1900.)
(No Model.)
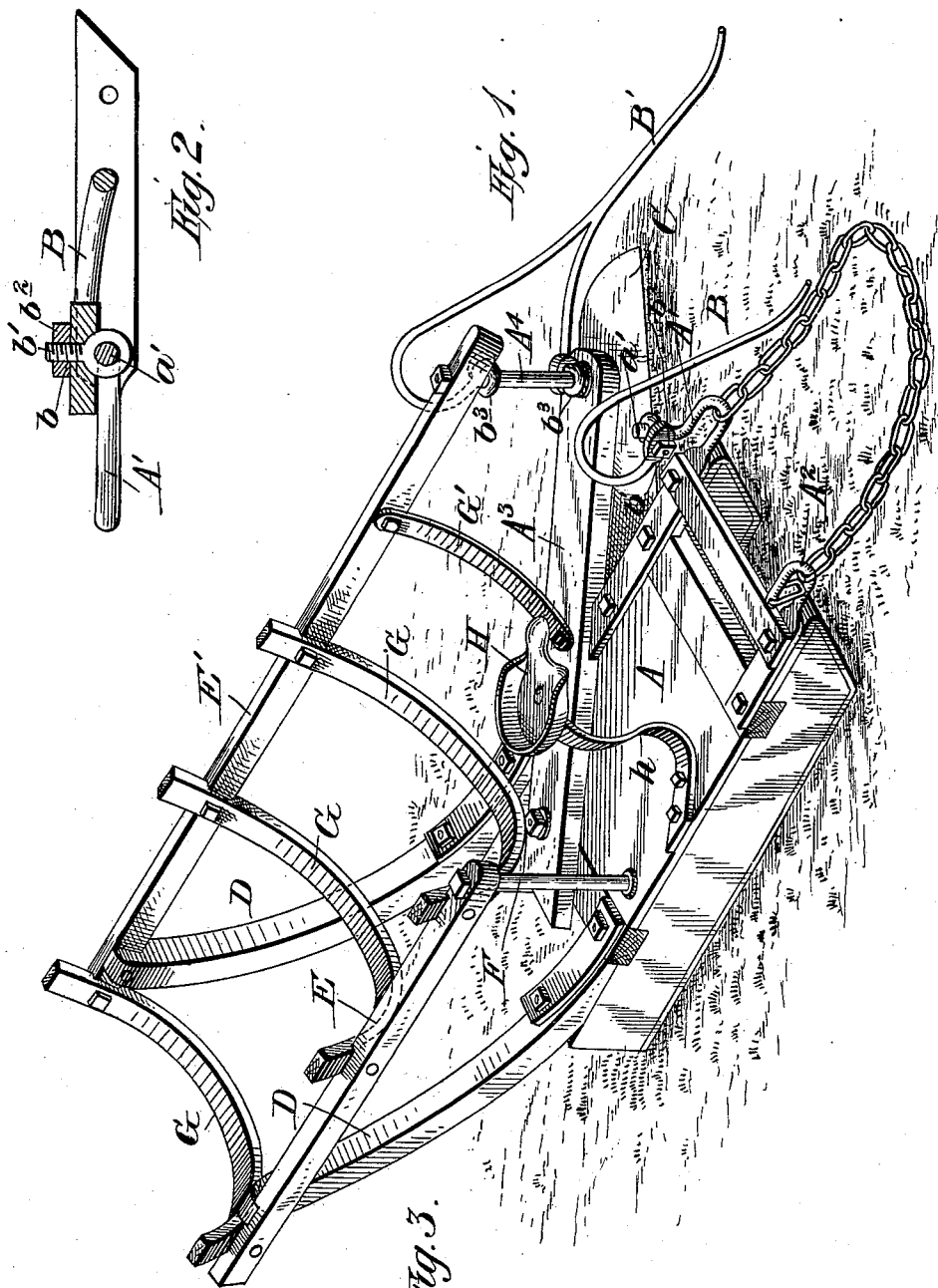
Witnesses:
Franck L. Ourand
Grace P. Brereton
Inventor:
Charles Tolle
by Geo. H. Evans
Attorney.

UNITED STATES PATENT OFFICE.

CHARLES TOLLE, OF GODFREY, ILLINOIS, ASSIGNOR OF ONE-HALF TO WILLIAM TOLLE, OF SAME PLACE.

CORN-HARVESTER.

SPECIFICATION forming part of Letters Patent No. 648,157, dated April 24, 1900.

Application filed January 20, 1900. Serial No. 2,137. (No model.)

*To all whom it may concern:*

Be it known that I, CHARLES TOLLE, a citizen of the United States, residing at Godfrey, in the county of Madison and State of Illinois, have invented certain new and useful Improvements in Corn-Harvesters, of which the following is a specification.

My invention relates to that class of corn-harvesters in which the body is in the form of a sled provided at one side with a fixed inclined knife to cut the cornstalks.

The objects of the invention are to provide a harvester of the class named which shall be simple, durable, and effective, to provide an improved rack for the cut stalks, and to provide easily-adjustable gathering hooks or prongs at opposite ends of the knife to direct the stalks thereto. These objects I accomplish by the mechanism shown in the accompanying drawings, in which—

Figure 1 is a front perspective of my improved corn-harvester, and Figs. 2 and 3 are detail views.

A represents the body or platform on runners or wheels and of a width to run between two rows of corn and provided at the front end of the runners with clevises or draft-hooks $A'$ $A^2$, the end of the hook $A'$ being extended upwardly in the form of a short post $a'$, on which is adjustably mounted the inner gathering hook or prong B. This prong B is provided at its inner end with an aperture $b$, through which is passed the shank of an eyebolt $b'$, the eye of said bolt fitting adjustably upon the post $a'$ of the draft-hook $A'$, where it is held in its adjusted position by means of the nut $b^2$. By loosening this nut the hook or prong B may be raised or lowered and also turned in or out, and then by tightening the nut the hook or prong will be drawn inwardly against the post $a'$, where it will be firmly held.

$A^3$ is an inclined or oblique bar firmly bolted to the platform and projecting beyond one side thereof about as far as the forward end thereof.

C is the oblique knife, bolted at its inner end to the body or platform by the same bolts as the draft-hook $A'$ and extending outwardly and forwardly under the bar $A^3$, to which it is also bolted.

$A^4$ is a vertical rod or bolt extending up from the forward end of the knife-bar $A^3$, and this rod or bolt receives the eyes of the two eyebolts $b^3$ $b^3$, the shanks of which bolts pass through apertures in the inner bifurcated or forked ends of the outer longer gathering hook or prong B'. This hook or prong may be adjusted vertically and horizontally on the bolt or rod $A^4$ in the same manner as the gathering-hook B. By these adjustable hooks B B' the fallen stalks will be picked up and guided to the knife.

D D are rearwardly and upwardly extending arms or bars bolted at their forward ends to the rear end of the body or platform, and to the upper ends of the arms D D are bolted the rear ends of two longitudinally-extending bars E E', the shorter bar E being supported at its forward end by a vertical post F and the longer bar E' being supported at its forward end upon the upper end of the bolt or bar $A^4$.

The bars E E' are connected by a series of downwardly-curved cross-bars G, a shorter curved bar G' connecting the bar E' with the knife-bar $A^3$. These bars E E' G G' constitute a rack for holding the cornstalks.

H is the driver's seat, mounted on a standard $h$, secured to the sled.

The operation is as follows: The driver sits on the seat, driving with one hand and pushing the stalks against the blade with the other. The cut stalks fall upon the rack and are hauled along until the shock is reached, when they are lifted from the rack and placed on the shock. The hooks or prongs B B', projecting forwardly and downwardly at each end of the oblique knife, pick up and guide to the knife the fallen or broken stalks.

If desired, the platform or frame may be mounted on wheels; but runners are preferred, because they hold the machine in proper position better than wheels, as the latter would follow depressions and cause the prongs or gathering-hooks to plow into the ground and also cause the knife to do the same.

Having thus described my invention, what I claim, and desire to secure by Letters Patent, is—

1. A corn-harvester comprising a suitable frame or platform having a knife-bar extending forwardly and outwardly from one side, a vertical post or bar at the outer end of the said knife-bar, an oblique knife, arms extending upwardly and rearwardly from the rear end of the frame or platform, a longitudinal bar extending from the upper end of one of said rearwardly-extending arms to said vertical post or bar, a shorter longitudinal bar extending from the upper end of the other rearwardly-extending arm to and supported by a vertical post or rod on the frame, and downwardly-bowed cross-bars connecting said longitudinal bars and forming a rack on which the cut stalks fall.

2. A corn-harvester comprising a frame or platform having a knife-carrying bar extending forwardly and outwardly from one side, a vertical post or bar at the outer end of the knife-bar, a gathering-hook adjustable on said post, upwardly-extending arms at the rear end of the platform, a longitudinal bar extending from the upper end of one of said rearwardly-extending arms to said vertical post or bar, an inner adjustable gathering-hook, a post on which said hook is mounted, a shorter longitudinal bar extending from the upper end of the other upwardly-extending rear arm, to and supported by, a vertical post or rod on the frame, and downwardly-bowed cross-bars connecting said longitudinal bars and forming a rack on which the cut stalks fall.

3. In a corn-harvester, a draft-hook provided with a vertical extension or post at its rear upper portion, a gathering-prong having a lateral aperture, and an eyebolt mounted on said post or extension with its shank extending through said aperture and provided with a nut; substantially as described.

4. A corn-harvester, consisting of a sled or frame, an oblique knife-bar and knife projecting from one side, upwardly and rearwardly projecting arms, longitudinal bars extending forwardly from the rear upper ends of said arms, a post at the outer end of the knife-bar supporting the forward end of the longer longitudinal bar, and a post on the sled or frame supporting the forward end of the shorter longitudinal bar, downwardly-curved cross-bars connecting the longitudinal bars and forming a fixed stalk-rack, a curved bar G', a seat opposite the knife, and gathering-prongs; substantially as described.

In testimony whereof I affix my signature in presence of two witnesses.

CHARLES TOLLE.

Witnesses:
W. C. ASHLOCK,
JOHN M. PFEIFFENBERGER.